United States Patent [19]

Flannery

[11] 3,942,992

[45] Mar. 9, 1976

[54] CHEMICALLY RESISTANT SILICATE GLASS

[75] Inventor: James E. Flannery, Corning, N.Y.

[73] Assignee: Corning Glass Works, Corning, N.Y.

[22] Filed: Nov. 18, 1974

[21] Appl. No.: 524,677

[52] U.S. Cl. .................................. 106/52; 106/54
[51] Int. Cl.² ........................................ C03C 3/04
[58] Field of Search .......................... 106/52, 50, 54

[56] References Cited
UNITED STATES PATENTS

| | | | |
|---|---|---|---|
| 3,457,183 | 7/1969 | Lee et al. | 106/52 |
| 3,673,049 | 6/1972 | Giffen et al. | 106/52 |
| 3,703,390 | 11/1972 | Girard et al. | 106/54 |

FOREIGN PATENTS OR APPLICATIONS

| | | | |
|---|---|---|---|
| 1,322,725 | 2/1963 | France | 106/50 |

*Primary Examiner*—Helen M. McCarthy
*Attorney, Agent, or Firm*—Clinton S. Janes, Jr.; Clarence R. Patty, Jr.

[57] ABSTRACT

This invention relates to silicate glasses that possess good resistance to chemical attack by both acid and alkaline media, that may be either clear and transparent or colored as desired, and that may have a moderate thermal coefficient of expansion to provide resistance to thermal shock. Such glasses have general application, but find particular utility in tubing and containers for scientific and pharmaceutical glassware.

3 Claims, No Drawings

CHEMICALLY RESISTANT SILICATE GLASS

BACKGROUND OF THE INVENTION

The widespread use of glass in the preparation and storage of foods, pharmaceuticals, beverages, and chemicals has occasioned extensive investigation into the factors influencing the resistance of glass surfaces to chemical attack, such resistance being referred to as "chemical durability". As a general rule, it has been found that glasses providing good durability to acid attack, and those providing good durability to alkaline attack, are mutually excludable. Low expansion borosilicate glasses having excellent acid durability are commercially available, but these glasses are quite prone to alkaline attack. Likewise, soda lime glasses having reasonably good alkaline durability, and special zirconia glasses having enhanced alkaline durability, are known, but the former are not acid resistant and the latter are difficult to melt and work.

PRIOR ART

As early as 1914, it was disclosed in U.S. Pat. No. 1,086,113, that the addition of $ZrO_2$ or $TiO_2$ to quartz glass improved chemical and thermal durability while reducing devitrification. Later, in U.S. Pat. No. 1,765,287, Scott disclosed the use of $ZrO_2$ to resist surface tarnishing in a dense barium crown optical glass. Studies directed at producing high strength glass fibers having good chemical durability led to minimizing the alkali metal content in borosilicate glasses and using alkaline earth metal oxides as fluxes, as disclosed, for example, in U.S. Pat. No. 2,335,463 to Steenbock. Glasses composed essentially of divilent metal oxides, alumina, and silica are disclosed as useful for nuclear purposes by Lajarte in U.S. Pat. No. 3,305,371 and No. 3,218,262. Finally, an $Ro-Al_2O_3-B_2O_3-SiO_2$ glass having physical characteristics suitable for drawing large tubing and sealing to molybdenum is disclosed in U.S. Pat. No. 3,310,413 by Harrington.

STATEMENT OF THE INVENTION

It has been found that zirconia ($ZrO_2$) is the only readily available glassmaking oxide which, when added to a silicate glass, will impart a substantial degree of resistance to alkaline attack while still maintaining good resistance to acid attack. However, it is generally difficult to dissolve zirconia in silicate melts, as evidenced by difficulty in melting, and by a high glass liquidus, when this oxide is present in substantial amount.

The present invention is founded upon my discovery that the inclusion of barium oxide (BaO) has a unique effect upon silicate glasses containing $ZrO_2$. Thus, the presence of BaO substantially enhances the solubility of $ZrO_2$ in such glasses and simultaneously acts to reduce the liquidus temperature thereof. These phenomena permit the use of a limited amount of $ZrO_2$ to improve resistance to alkaline attack while providing a glass that is relatively easy to melt and work.

The invention then is a chemically resistant glass consisting essentially of, as calculated in cation percent on an oxide basis, 59–70% $SiO_2$, 9–15% $AlO_{1.5}$, 5–25% BaO, 0–17% CaO, 0–7% ZnO, the total BaO + CaO + ZnO being 15–30%, and at least 2% but less than 5% $ZrO_2$. These cation percent ranges, used because of ease in making comparative substitutions, are roughly equivalent, on a percent by weight basis, to 44–60% $SiO_2$, 6–12% $Al_2O_3$, 10–40% BaO, 0–15% CaO, 0–10% ZnO, the total BaO + CaO + ZnO being 20–50%, and at least 3% but less than 7½% $ZrO_2$.

I have further found that the highest degree of chemical durability can be secured when the $ZrO_2$-containing glass is essentially completely free from alkali metal oxides and $B_2O_3$. Therefore, the chemically-resistant glass of my invention preferably is essentially free from alkali metal oxides and $B_2O_3$.

GENERAL DESCRIPTION

The key ingredients in the present glasses are $ZrO_2$ and BaO. At least 2 cation percent of $ZrO_2$ is required to provide an adequate degree of chemical durability, particularly resistance to alkaline attack. However, the glass liquidus rises rapidly as the $ZrO_2$ content of a glass exceeds the 4% level, and this content must, therefore, be maintained below 5%. At least 5% BaO is required to permit use of $ZrO_2$ as just described, and, for $ZrO_2$ solubility purposes, relatively high BaO contents up to 25% are preferred. However, as the amount of BaO exceeds about 20%, the coefficient of expansion of the glass tends to increase markedly, thus resulting in a loss of thermal shock resistance. Therefore, the BaO content should not exceed about 24%, and preferably not over 20%.

The presence of alkali metal oxides, in addition to having an adverse effect on durability, also tends to make the present glasses very cordy, and hence difficult to homogenize and work. However, minor amounts may be tolerated. MgO is also preferably avoided for this reason. Other divalent metal oxides may be present in limited amounts, including, in particular, up to 17% CaO and/or up to 7% ZnO, although these oxides also have a general tendency to produce cordy glass. These other divalent metal oxides do not have the $ZrO_2$ solvent power of BaO, but CaO steepens the glass viscosity curve. This yields a higher strain point, and hence a higher use temperature, for a given melting temperature. Zinc oxide does not raise the expansion coefficient to the extent that BaO does, but is an expensive material, and does increase the glass liquidus more quickly, as does CaO. Hence, these oxides must be limited as indicated.

Silica is the glass-forming oxide and must be maintained within limits to provide a stable, easily-melted glass. At least 9% $AlO_{1.5}$ is required to provide the desired high chemical durability, whereas over 15% tends to increase the thermal expansion coefficient undesirably and also creates melting problems.

Minor amounts of other compatible glassmaking oxides such as $La_2O_3$ may be present if desired. Up to about five cation percent boric oxide ($B_2O_3$) may be present, but does diminish acid durability, and larger amounts should be avoided for this reason. The usual glass colorants and fining agents may be present in normal amounts of up to a percent or so if desired. However, they will usually be avoided in scientific glassware where they are recognized impurity sources.

The present glasses may be melted from generally available raw materials including screened sand, calcined alumina, barium carbonate, milled zirconium silicate, zinc oxide, and calcium carbonate. They may be melted from well-mixed batches at temperatures of 1500°–1600°C. in either electrically or gas heated furnaces and then worked in conventional manner. It is a feature of the present glasses that their low liquidus values permit machine forming of tubing.

SPECIFIC DESCRIPTION

The glasses of the present invention are primarily characterized by their good resistance to both alkaline and acid attack. Numerous tests have been devised to qualify glasses for specific applications. For general durability purposes, however, an acid test is preferred wherein a glass sample is exposed to a 5% by weight hydrochloric acid (HCl) solution at 95°C. for 24 hours. In a corresponding alkali test, a similar sample is exposed to a 5% by weight caustic (NaOH) solution at 95°C. for six (6) hours.

Both prior and subsequent to exposure, a glass test sample is carefully weighed and its surface area measured so that loss in weight (Wt. Loss) in milligrams per square centimeter (mgs./cm.$^2$) can be calculated. After exposure, the sample is also visually observed to determine surface appearance, since a moderate weight loss may be tolerated in many applications, providing it is not coincident, as it frequently is, with a stained or iridescent surface.

The differing requirements of different applications make it difficult to establish critical durability limits. In general, however, a glass should show no appreciable change in surface appearance. Further, it is preferred that a glass show a weight loss not over about 0.05 mgs./cm.$^2$ in the acid test, and a weight loss not over about 0.50 mgs./cm.$^2$ in the caustic solution test. The appearance change may vary from a slight iridescence on the sample surface (which may be acceptable in some instances) to more severe effects manifested by a frosted or pitted appearance over the glass surface.

Another characteristic of particular significance is glass liquidus temperature, that is, the maximum temperature at which a glass and its primary crystal phase are in equilibrium. This temperature, together with the glass viscosity-temperature relationship, determines the manner in which a glass can be worked, and more particularly whether it is adaptable to tube drawing practices.

Expansion coefficient is generally of less importance in the present glasses, although a moderate coefficient below about $70 \times 10^{-7}$/°C. (0°–300°C.) may be desired for thermal shock purposes where autoclaving or similar sterilizing practices are to be employed on the final product. To this end then, BaO is preferably utilized in an amount no greater than 20% and CaO and/or ZnO may be included where additional fluxing action is needed.

Table IA, below, sets forth, in cation percent calculated on an oxide basis, several glass compositions exemplifying the invention. Also presented are (1) durability data in terms of weight loss, (2) appearance after exposure to both acid and alkaline tests as described above, and (3) liquidus temperatures in degrees Centigrade (°C.). Table IB sets forth the corresponding compositions in weight percent.

TABLE IA

|  | 1 | 2 | 3 | 4 | 5 | 6 | 7 | 8 | 9 | 10 |
|---|---|---|---|---|---|---|---|---|---|---|
| SiO$_2$ | 65 | 65 | 63 | 63 | 65 | 59.6 | 61 | 67 | 60 | 65 |
| AlO$_{1.5}$ | 11 | 13 | 13 | 15 | 13 | 9.4 | 11 | 13 | 11 | 11 |
| BaO | 20 | 18 | 20 | 20 | 20 | 5.6 | 20 | 17 | 20 | 10 |
| CaO | — | — | — | — | — | 14.9 | — | — | — | 10 |
| ZnO | — | 2 | 2 | — | — | 6.5 | — | — | — | — |
| ZrO$_2$ | 4 | 2 | 2 | 2 | 2 | 3.7 | 4 | 3 | 4 | 4 |
| BO$_{1.5}$ | — | — | — | — | — | — | 4 | — | 5 | — |
| Wt. Loss (mgs./cm.$^2$) | | | | | | | | | | |
| HCl | 0.04 | 0.02 | 0.05 | 0.06 | 0.04 | 0.03 | 0.04 | 0.02 | 0.05 | 0.02 |
| NaOH | 0.27 | 0.47 | 0.47 | 0.45 | 0.42 | 0.31 | 0.35 | 0.38 | 0.38 | 0.23 |
| Appearance | | | | | | | | | | |
| HCl | N.C. | N.C. | N.C. | N.C. | N.C. | N.C. | N.C. | N.C. | Slight Frost | N.C. |
| NaOH | N.C. | N.C. | Irid. | N.C. | N.C. | N.C. | Slight Frost | Slight Frost | Slight Frost | Slight Frost |
| Liquidus (°C.) | 930 | 898 | 867 | 824 | 786 | 1192 | — | — | — | — |

NOTE:
N.C. means no change in appearance.

TABLE IB

|  | 1 | 2 | 3 | 4 | 5 | 6 | 7 | 8 | 9 | 10 |
|---|---|---|---|---|---|---|---|---|---|---|
| SiO$_2$ | 48.7 | 50.5 | 47.8 | 48.1 | 49.6 | 53.2 | 46.2 | 52.5 | 45.7 | 55.4 |
| Al$_2$O$_3$ | 7.0 | 8.6 | 8.4 | 9.8 | 8.4 | 7.1 | 7.1 | 8.7 | 7.1 | 8.0 |
| BaO | 38.2 | 35.6 | 38.7 | 39.0 | 38.9 | 12.7 | 38.7 | 34.0 | 38.8 | 21.7 |
| CaO | — | — | — | — | — | 12.4 | — | — | — | 7.9 |
| ZnO | — | 2.1 | 2.0 | — | — | 7.8 | — | — | — | — |
| ZrO$_2$ | 6.1 | 3.2 | 3.1 | 3.1 | 3.1 | 6.8 | 6.2 | 4.8 | 6.2 | 7.0 |
| B$_2$O$_3$ | — | — | — | — | — | — | 1.8 | — | 2.2 | — |

Table IIA sets forth the calculated chemical compositions, in cation percent on an oxide basis, and pertinent properties for several additional glasses. These examples are within the same general composition family as the glasses of the present invention, but the proportion of at least one component is somewhat outside one of the definitive operable ranges for the present glasses. Table IIB sets forth the corresponding glass compositions in weight percent.

TABLE IIA

|  | 11 | 12 | 13 | 14 | 15 |
|---|---|---|---|---|---|
| SiO$_2$ | 65 | 67 | 63.7 | 61.8 | 61.8 |
| AlO$_{1.5}$ | 10 | 13 | 12.8 | 9.6 | 13.8 |
| BaO | 20 | 20 | 19.6 | 2.9 | 3.8 |
| CaO | — | — | — | 15.2 | 14.4 |
| ZnO | — | — | — | 6.7 | 6.1 |
| ZrO$_2$ | 5 | — | — | 3.8 | — |
| LaO$_{1.5}$ | — | — | 3.9 | — | — |
| Wt. Loss (mgs./cm.$^2$) | | | | | |
| HCl | 0.02 | 0.05 | 0.05 | 0.03 | — |
| NaOH | 0.56 | 2.6 | 1.7 | 0.30 | 0.82 |
| Appearance | | | | | |

TABLE IIA-continued

|  | 11 | 12 | 13 | 14 | 15 |
|---|---|---|---|---|---|
| HCl | N.C. | N.C. | N.C. | N.C. | — |
| NaOH | N.C. | Frost | Frost | N.C. | Slight Irid. |
| Liquidus (°C.) | 1379 | 1081 | 1028 | 1396 | — |

TABLE IIB

|  | 11 | 12 | 13 | 14 | 15 |
|---|---|---|---|---|---|
| $SiO_2$ | 48.2 | 51.9 | 47.1 | 57.0 | 58.9 |
| $Al_2O_3$ | 6.3 | 8.6 | 8.1 | 7.5 | 11.2 |
| BaO | 37.9 | 39.5 | 37.0 | 6.8 | 9.2 |
| CaO | — | — | — | 13.1 | 12.8 |
| ZnO | — | — | — | 8.4 | 7.9 |
| $ZrO_2$ | 7.6 | — | — | 7.2 | — |
| $La_2O_3$ | — | — | 7.8 | — | — |

Glass 11 illustrates the effect of excess $ZrO_2$ on the liquidus temperature, while glass 14 illustrates the same effect when an excess of CaO and/or ZnO is present. Incidentally, glass 6 of Table I shows the trend toward a high liquidus temperature starting within the present glasses when BaO is low. In glasses 11 and 14, the durability is quite satisfactory, but the liquidus temperature would seriously limit melting and forming procedures.

Glass 12 illustrates the effect of omitting $ZrO_2$ from the present glasses. While acid durability is acceptable, the alkaline durability is well outside acceptable limits. Glass 13 shows that adding an oxide such as $La_2O_3$, rather than $ZrO_2$, does not correct the deficiency. Likewise, glass 15 shows that CaO and ZnO, in the absence of $ZrO_2$, while somewhat better than BaO alone, are not as effective as desired.

The significant advantages provided by the invention are further illustrated in Table III which compares the properties of Example 1 of Table I with those of a previously available commercial glass of high chemical durability referred to as Glass A. The latter glass is composed essentially, in cation percent on an oxide basis, of 67.4% $SiO_2$, 21.1% $NaO_{0.5}$, 3.8% $LiO_{0.5}$, and 7.7% $ZrO_2$.

TABLE III

|  | Glass A | Example I |
|---|---|---|
| Liquidus (°C.) | 1059 | 930 |
| Viscosity in Poises at Liquidus | $2.9 \times 10^5$ | $1 \times 10^7$ |
| Softening Point (°C.) | 880 | 994 |
| Annealing Point (°C.) | 624 | 783 |
| Strain Point (°C.) | 573 | 736 |
| Expansion $\times 10^{-7}$/°C. (0–300°C.) | 63.8 | 60.1 |
| Wt. Loss (mgs./cm.$^2$) |  |  |
| HCl | 0.05 | 0.04 |
| NaOH | 0.13 | 0.27 |
| Appearance |  |  |
| HCl | N.C. | N.C. |
| NaOH | Slight Irid. | N.C. |

Thus, the present preferred glass has a markedly lower liquidus temperature which facilitates glass working, has a maximum use temperature, as gauged by the strain point, that is at least 100°C. higher, and avoids the iridescent surface appearance that developed on the commercial glass in spite of its low weight loss.

I claim:

1. A chemically resistant glass essentially free from alkali metal oxides and $B_2O_3$ and exhibiting a weight loss not over about 0.05 mgs./cm.$^2$ when exposed to a 5% by weight HCl solution at 95°C. for 24 hours and a weight loss not over about 0.5 mgs./cm.$^2$ when exposed to a 5% by weight NaOH solution at 95°C. for 6 hours consisting essentially of, as calculated in cation percent on an oxide basis, 59–70% $SiO_2$, 9–15% $AlO_{1.5}$, 5–25% BaO, 0–17% CaO, 0–7% ZnO, the total BaO + CaO + ZnO being 15–30%, and at least 2% but less than 5% $ZrO_2$.

2. A chemically resistant glass in accordance with claim 1 wherein the BaO content does not exceed 20%.

3. A chemically resistant glass in accordance with claim 1 consisting of, in cation percent on an oxide basis, 65% $SiO_2$, 11% $AlO_{1.5}$, 20% BaO, and 4% $ZrO_2$.

* * * * *